United States Patent [19]

Cox et al.

[11] Patent Number: 5,758,275
[45] Date of Patent: May 26, 1998

[54] METHOD AND APPARATUS FOR SCHEDULING ADAPTATION FOR A NOTCH FILTER

[75] Inventors: Gregory W. Cox, Schaumburg; Robert F. Lay; Douglas M. Hamilton, both of Elgin; Mark Gannon, Sleepy Hollow; Steven C. Jasper, Hoffman Estates; Manuel P. Gabato, Palatine, all of Ill.

[73] Assignee: Motorola, Inc., Schaumburg, Ill.

[21] Appl. No.: 537,196

[22] Filed: Sep. 29, 1995

[51] Int. Cl.[6] ........................ H04B 1/10
[52] U.S. Cl. ................ 455/307; 455/306; 455/334
[58] Field of Search ........................ 455/296, 303, 455/304, 305, 306, 307, 334, 339; 333/176; 327/556, 724.19; 364/724.01, 724.16; 375/346, 348

[56] References Cited

U.S. PATENT DOCUMENTS

| | | | |
|---|---|---|---|
| 4,524,424 | 6/1985 | White | 364/724 |
| 5,226,057 | 7/1993 | Boren | 375/103 |
| 5,235,612 | 8/1993 | Stilwell et al. | 455/296 |
| 5,345,407 | 9/1994 | Hosteler | 364/724.01 |
| 5,519,890 | 5/1996 | Pinckley | 455/307 |

Primary Examiner—Reinhard J. Eisenzopf
Assistant Examiner—Marsha D. Banks-Harold
Attorney, Agent, or Firm—Susan L. Lukasik

[57] ABSTRACT

EMI spur interference is reduced in a system where the desired signal has periodically repeating components without destructively interfering with the repeating components. The frequency of the spur interference is determined (203) and fed to a notch filter (201) so as to center the notch at the frequency of the spur interference. Determination of the frequency is scheduled (601) to avoid cancellation of desired periodically repeating components of the signal.

17 Claims, 2 Drawing Sheets

METHOD AND APPARATUS FOR SCHEDULING ADAPTATION FOR A NOTCH FILTER

FIELD OF THE INVENTION

This invention relates to electronic signal filters, including but not limited to adaptation of notch filters.

BACKGROUND OF THE INVENTION

Portable electronic devices such as notebook computers, radio frequency (RF) data terminals, and personal digital assistants (PDA's) produce electromagnetic interference (EMI). These emissions are caused by internal electrical signals such as clocks, data busses, and control lines changing and radiating. These radiated signals have spectral components which may interfere in frequency bands used for data transmission. These spectral components may be wideband or narrowband spectral components and are commonly referred to as spurs. Spurs may vary in frequency and amplitude over time depending on the state of the computing device. When a subscriber unit RF data modem is connected to a portable computing device, the receiver is in close proximity to the computer, and hence is susceptible to spurs or EMI generated by the computing device. Because radiated EMI may be located in the radio frequency band used for wireless data transmission, shifting the receiver's intermediate frequency will not avoid interference. The computer's CPU and other clock frequencies cannot feasibly be altered (warped) to move the spur out of the desired RF channel. This warping solution has been shown to work well within RF modem products where an internal processor is interfering with a received signal. Another possible solution is for the subscriber unit to request a new frequency assignment once the spur corruption of the original channel is detected. This method may not be practical during high system loading periods or when channels available for data are otherwise limited. Thus, the RF data modem may be required to deal with a powerful EMI spur within its received signal, which spur is not easily eliminated.

Known means to solve this problem include a notch filter with a center frequency determined before the start of the desired message. Bench measurements have shown however that the spur frequency varies significantly with time, temperature, and power supply voltage, particularly within a portable computing device. Common user actions such as plugging in an external CRT, connecting to an external power supply, disk activity, or closing the display to conserve battery power can abruptly shift the amplitude and frequency of an EMI spur. The notch is required to be narrow to prevent absorption of a significant amount of desired signal energy. The shifts in frequency are quite frequently many times the allowable notch width. Thus, the center frequency of the notch cannot remain fixed.

Another approach to the EMI spur problem is an adaptive notch filter. The nature of the EMI spur cancelling problem, however, may preclude the use of a simple adaptive notch filter, e.g., depending on the type of modulation used. For example, pilot symbol assisted modulation is a well-known technique for carrier recovery in which known symbols are inserted into the transmitted signal at regular intervals. Synchronization symbols may also be inserted into a transmitted signal to provide timing recovery information. Desired signals that incorporate periodically repeating components, such as synchronization and pilot symbols, may be adaptively cancelled by a classic adaptive notch filter. Such cancelling depends on the amplitude of the spur relative to the desired signal strength and results in the loss of timing or carrier recovery information.

Accordingly, there is a need for a method to reduce EMI spurs in signals having periodically repeating components.

DESCRIPTION OF A PREFERRED EMBODIMENT

The following describes an apparatus for and method of reducing EMI spur interference where the desired signal has periodically repeating components. The frequency of EMI interference is determined and fed to a notch filter so as to center the notch at the frequency of the EMI interference. Determination of the frequency is scheduled to avoid cancellation of desired periodically repeating components of the signal.

Figure 3:
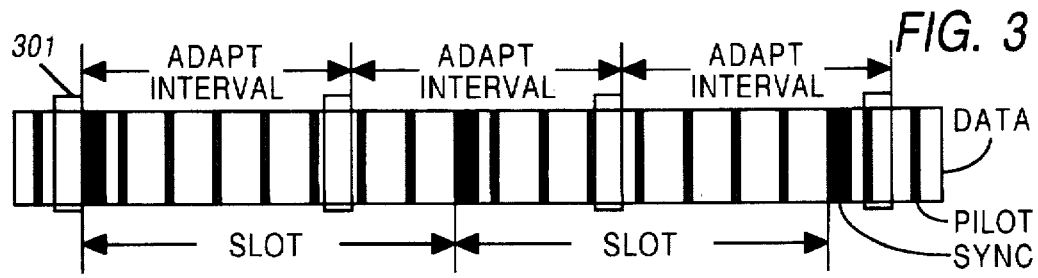
FIG. 3 is a timing diagram showing scheduling of adaptation in accordance with the invention.

The environment of the preferred embodiment of the present invention is a receiver in a wireless communications system employing time-domain synchronization symbols for timing recovery and time-domain pilot symbols for carrier recovery. The system also employs time division multiplexing (TDM) to allow several users to share the same radio frequency channel. In the preferred embodiment, a slot is referred to as the structure of the smallest repeating time unit in the modulation containing a fixed pattern of pilot and synchronization symbols. A possible slot structure and slot length is illustrated in FIG. 3. A burst is referred to as a contiguous series of slots received by the same user.

The present invention addresses narrow band or spur emissions. In the preferred embodiment, spectral estimation is performed to determine the initial estimated frequency of a spur in a received signal, providing a starting point for filter adaptation. This information is sent to a notch filter, which can be any type of notch filter, where the spur is cancelled from the received signal. The notch filter of the preferred embodiment is a simple single pole/zero filter. Nevertheless, the notch filter can be any narrow-band rejection filter. The center frequency of the notch filter is set to the frequency determined by the spectral estimation. The notch filter is then adaptively moved toward the particular frequency of the spur in the selected receive channel. The present invention schedules its adaptation to look at different segments of the desired signal structure without cancelling portions such as time domain pilot symbols and synchronization symbols that may be periodic. Time domain pilot and synchronization symbols may result in spur-like features in the desired signal. Without scheduled adaptation, the spur canceller might lock onto one of these spur-like features, thereby impairing the desired signal.

The present invention is particularly useful when it is unknown where interference is located in the frequency spectrum. In addition, the internal state of the notch filter is not used in the calculation of the frequency of the EMI spur or in the process of determining the adaptation for the notch filter, therefore the particular structure of the notch filter is not critical to the adaptation method of the present invention. Therefore, the present invention is independent of notch filter structure, and therefore the adaptation need not change if the notch filter is changed.

Figure 1:
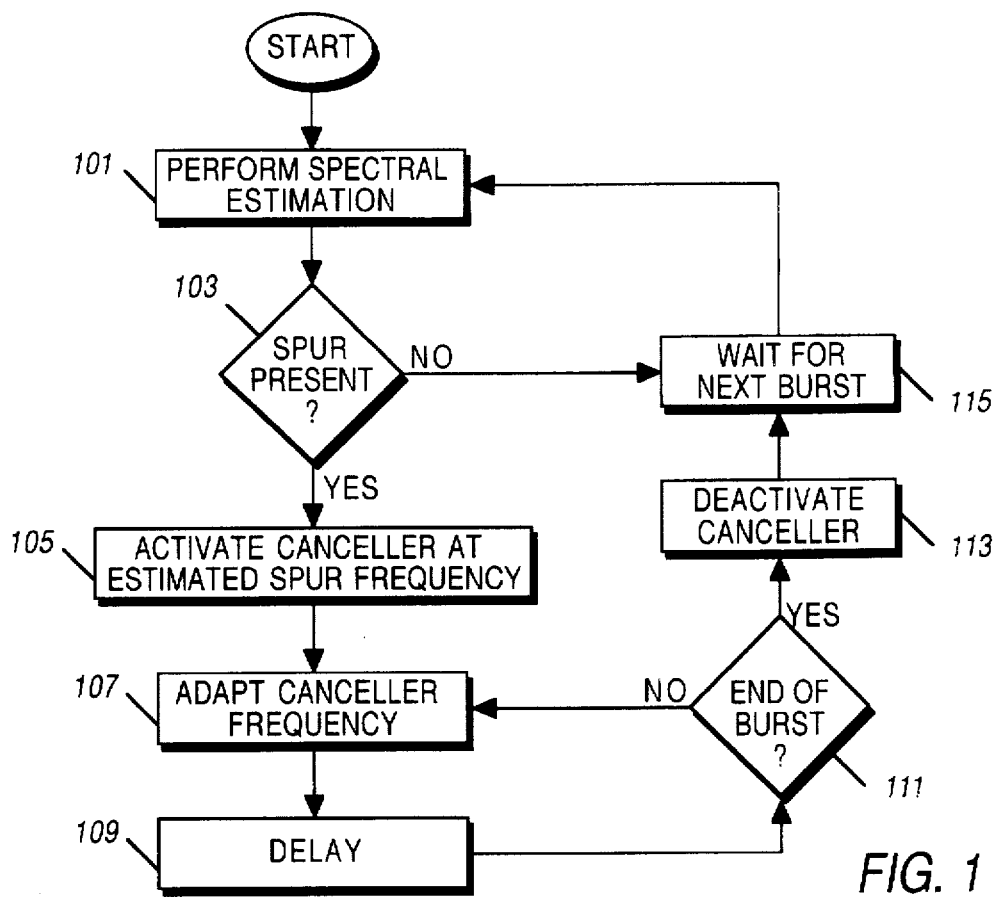
FIG. 1 is a flowchart showing EMI spur cancellation in accordance with the invention.

The flow chart of FIG. 1 shows a method of EMI spur cancellation in accordance with the present invention. At step 101, spectral estimation is performed, whereby a spur is detected and localized in frequency. If at step 103 there is a spur present, the process continues with step 105, where the canceller is activated at the estimated spur frequency as determined in step 101. At step 107, the canceller frequency is adapted using a portion the notch filter's input and output samples to track changes in the spur frequency. The process continues with step 109, where there is a delay that may be a fixed or variable amount of time designed to avoid periodically repeating features of the desired signal. The delay will be zero when adaptation is continuous. At step 111, if the end of a burst is not present, the process continues with step 107, where the notch filter center frequency is adapted. If at step 11, an end of burst is detected, the process continues with step 113, where the canceller is deactivated. At step 115, which follows from step 103 if no spur is present or from step 113, if the canceller is deactivated, the process waits for the next burst, and the process continues with step 101. The method of FIG. 1 is performed by the apparatus of FIGS. 2, 4, 5, and/or 6. The method and apparatus are implemented in a Digital Signal Processor (DSP), such as a DSP56166, available from Motorola, Inc.

Figure 2:
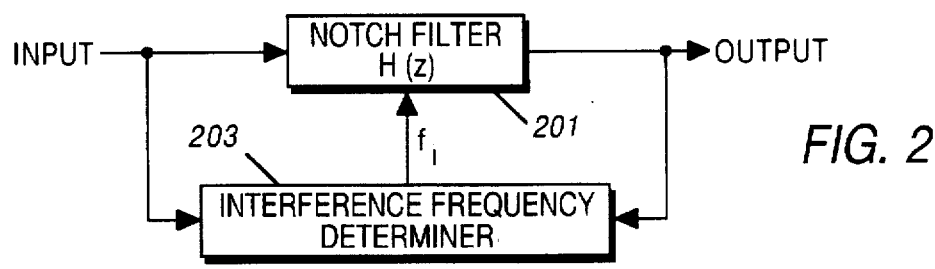
FIG. 2 is a block diagram of a spur canceller in accordance with the invention.

The block diagram of FIG. 2 shows a spur canceller. An input signal, containing a desired signal and an interfering spur signal, is received and input to a notch filter 201. In the preferred embodiment, the interfering signal is not assumed to retain a constant frequency. The notch filter 201 has a signal input, a frequency control input, and an output. The notch filter 201 has a transfer function:

$$H(z) = \frac{1 - cz^{-1}}{1 - (1 - b_1 b_2) cz^{-1}}, \text{ where } c = e^{j2\pi \frac{f_i}{f_{sample}}}.$$

The input signals to an interference frequency determiner 203 include the input signal to the notch filter 201 and the output signal from the notch filter 201. The interference frequency determiner 203 measures the frequency of the interfering signal and adapts the notch filter 201 to the frequency of the interference, $f_i$, by outputting the signal $f_i$ to the frequency control input of the notch filter 201. The frequency $f_{sample}$ is the sampling frequency at which the digital samples were taken that are input to the notch filter 201. The interference frequency determiner 203 schedules the adaptation and the measurement to avoid cancelling regular or periodic features of the desired signal. Although scheduled adaptation is utilized in the preferred embodiment, it is not necessary in general, especially if the desired signal has no repetitive features or patterns.

In the preferred embodiment, the scheduling step is performed on a periodic basis, where the period of adaptation or the "adapt interval" is chosen so as not to evenly divide a slot. The scheduling of adaptation is illustrated in FIG. 3. In the example, the selected adapt interval of 10.67 milliseconds does not evenly divide the slot time of 15 milliseconds. FIG. 3 also shows that not all of the received samples are considered in the adaptation, rather only a selected number of samples 301 prior to the adaptation are included. The number of samples included is determined by the depth of the integrate and dump block 609 shown in FIG. 6, the operation of which is described below. As shown in FIG. 3, the contents of the integrate and dump block, i.e., the samples 301 used to determine adaptation, do not include the same regular features of the modulation (pilots and syncs) on consecutive adaptations. Thus, the only feature of the received samples which is included in all adaptations will be the interfering spur, which greatly increases the likelihood that the adaptation will lock onto a interfering spur rather than a regular feature of the desired signal.

The adapt interval could also be chosen according to a random variable with mean and deviation selected according to the application. Alternatively, the adapt interval could be selected so as to deterministically avoid any regular features of the modulation provided that time synchronization is acquired before adaptation is scheduled. Such time synchronization is not always possible in the presence of a powerful interfering spur, because the spur can encumber the reception of the synchronization signal.

Figure 5:
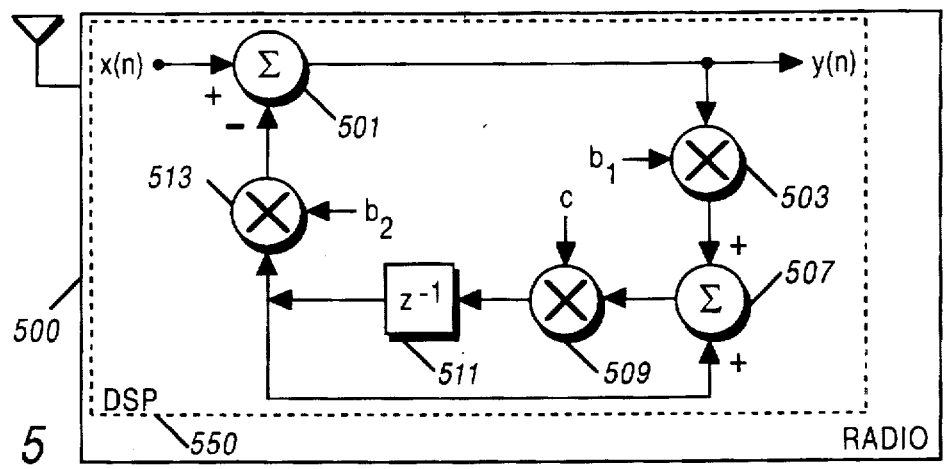
FIG. 5 is a block diagram of a notch filter with a spur canceller in accordance with the invention.

As can be seen from FIG. 2, the internal state of the notch filter is not required to determine the interference frequency, hence the type of notch filter is not critical toward the adaptation scheme used to adapt the notch filter. Thus, the adaptation method of the present invention is not limited by the type of notch filter, as are the adaptation methods in the prior art. In the preferred embodiment, the apparatus of FIG. 2, the notch filter and the interference frequency determiner, is disposed in a radio frequency receiver 500, such as is shown in FIG. 5.

Figure 4:
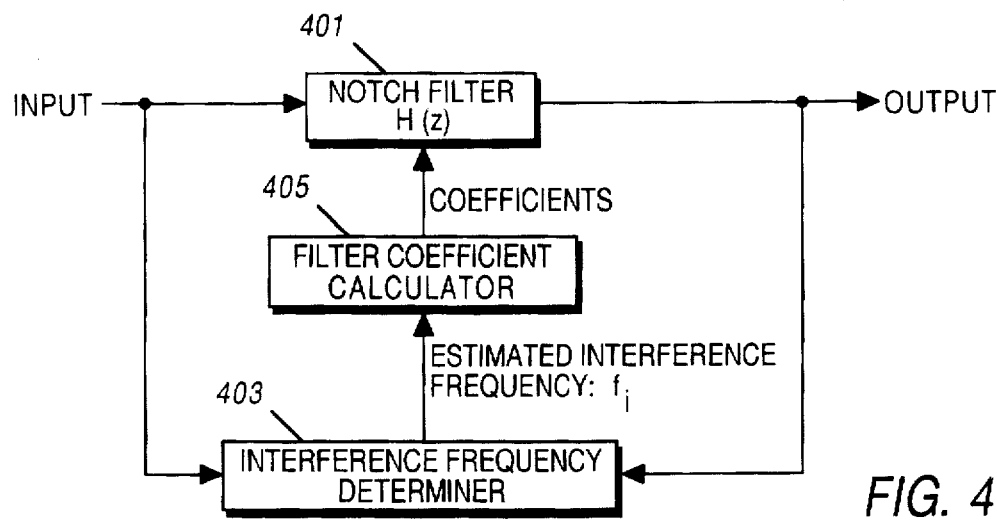
FIG. 4 is a block diagram of an alternative spur canceller in accordance with the invention.

A block diagram is shown in FIG. 4, which contains an alternative version of the spur canceller of FIG. 2. The spur canceller of FIG. 4 performs the same functions as the spur canceller of FIG. 2, as described above, and in addition calculates filter coefficients. A notch filter 401, having a frequency control input, a signal input, and an output, has a transfer function H(z), where $$H(z) = \frac{1 - cz^{-1}}{1 - (1 - b_1 b_2) cz^{-1}}$$

and where c is a complex value constrained to lie on the unit circle in the complex plane which determines the center frequency of the notch filter.

The notch filter 401 receives the input signal including both the desired signal and the interfering spur and outputs a signal with the interfering spur attenuated. The notch filter's 401 input signal and output signal are input to an interference frequency determiner 403, which is similar to the interference frequency determiner 203 described above. The interference frequency determiner 403 outputs an estimated interference frequency, which is input to a filter coefficient calculator 405. The filter coefficient calculator 405 is arranged and constructed to convert the estimated interference frequency to a coefficient suitable for input to the frequency control input of the notch filter. In the preferred embodiment, the filter coefficient calculator 405 is a complex exponential filter coefficient calculator. The filter coefficient calculator 405 calculates the coefficient c according to the equation:

$$c = e^{j2\pi \frac{f_i}{f_{sample}}}.$$

The coefficient calculator 405 outputs coefficients to the frequency control input of the notch filter 401, which coefficients are used to adapt the notch filter 401 to the frequency of the particular spur being cancelled. In the preferred embodiment, the apparatus of FIG. 4, the notch filter, the filter coefficient calculator, and the interference frequency determiner, is disposed in a radio frequency receiver 500, such as is shown in FIG. 5.

A particular embodiment of a notch filter with a spur canceller is shown in the block diagram of FIG. 5. An input signal x(n) is a positive input to a first summer 501. The output signal, y(n), of the first summer 501 is input to a first multiplier 503 which scales the signal by the scalar value $b_1$. The output of the first multiplier 503 is input to the positive input of a second summer 507. The output of the second summer 507 is input to a second multiplier 509, which multiples the signal by the complex-valued coefficient c, where c is the unit magnitude complex filter coefficient for this particular notch filter and determines the center frequency of the notch. Generally, the coefficient calculator 405 of FIG. 4 outputs coefficients to the complex multiplier 509 within the notch filter illustrated in FIG. 5. The output of the second multiplier 509 is input to a unit sample delay 511 of one-bit time duration. The output of the delay 511 is input to a positive input of the second summer 507 and is also input to a third multiplier 513, which multiplies the signal by the scalar value $b_2$.

The product of the real values $b_1$ and $b_2$ determines the bandwidth of the filter. The scalars $b_1$ and $b_2$ are both greater than zero and less than or equal to one. The product of $b_1$ and $b_2$ is greater than zero but less than one. The closer the product is to one, the narrower the bandwidth of the filter. For a fixed product of $b_1$ and $b_2$ and hence a given filter bandwidth, the values of $b_1$ and $b_2$ may be altered to optimize the tradeoff between filter quantization noise enhancement (which increases as $b_2$ increases) and the maximum amplitude signal which the filter can process without distortion (which increases as bi decreases) when using a fixed precision digital implementation of a filter. The output of the third multiplier 513 is input to a negative input to the first summer 501, effectively subtracting the spur from the received signal. In the preferred embodiment, the apparatus of FIG. 5 is within a DSP 550 disposed in a radio frequency receiver 500.

Figure 6:
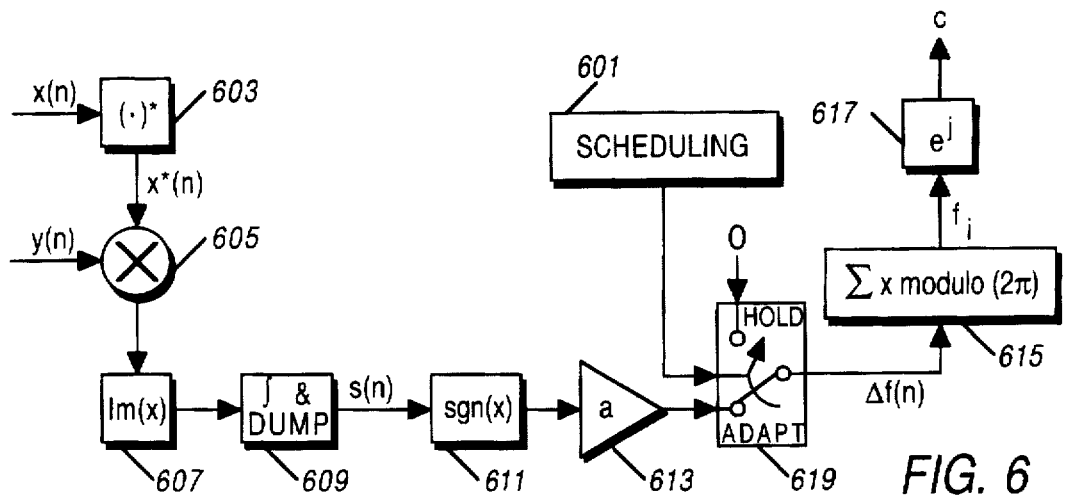
FIG. 6 is a block diagram of an interference frequency determiner in accordance with the invention.

A detailed block diagram of an interference frequency determiner 203/403 is shown in FIG. 6. The interference frequency determiner 203/403 is comprised of two basic function blocks, scheduling, in block 601, and adaptation, in blocks 603, 605, 607, 609, 611, 613, and 615. A scheduling block 601 is used to schedule when the canceller operates, such that any periodic features of the desired signal are not automatically eliminated by the spur canceller. The function of the scheduling block is described in detail below.

In the preferred embodiment, the adaptation block is comprised as follows. The complex-valued input to the notch filter, x(n), is input to a complex conjugator 603, which produces the complex conjugate of x(n), referred to as x*(n). The conjugated notch filter input x*(n) and the complex-valued notch filter output y(n) are multiplied by the complex multiplier 605. The complex-valued product of x*(n) and y(n) is stripped of its real component by the imaginary component block 607 or filter. The output of the imaginary component block 607, a scalar-valued imaginary component of the product of x*(n) and y(n), is fed into an integrate and dump block 609, which produces a scalar-valued output according to the equation:

$$s(n) = \sum_{i=(n-N+1)}^{n} Im\{x^*(i)y(i)\},$$

where "N" is the depth of the integrate and dump block that determines the number of samples used in an adaptation step. The operation of the interference frequency determiner is assumed to begin at time zero. Values of x(i) and y(i) for negative time are assumed to be zero.

The output s(n) of the integrate and dump block 609 is input into the sign determining block 611, which outputs +1 when s(n) is non-negative and −1 when s(n) is negative. The sign signal is input into the scaler 613, which scales by the adaptation step size a. Larger values of the step size a provide for faster spur frequency tracking at the expense of less precise frequency resolution. Smaller values of the step size a provide for more precise frequency resolution at the expense of slower spur frequency tracking. The adaptation step size a can be varied dynamically depending on the conditions encountered by the receiver.

The adaptation step $\Delta f(n)$ is controlled by switch 619 according to the equation:

$\Delta f(n) = a\ sgn(s(n))$, when switch 519 is set to "adapt"

0 when switch 519 is set to "hold." The scheduling block 601 controls the switch 619 which determines whether the frequency estimate will hold, thereby outputting a "0" to block 616 or adapt, thereby outputting the output of multiplier 613. In the example shown in FIG. 3, the switch 619 is set to adapt for one sample period every 10.67 milliseconds.

The output of the scaler 613 is input to a modulo ($2\pi$) summer 615 that outputs the interference frequency, $f_i(n)$, expressed in radians according to the equation:

$$f_i(n) = \left\{ f_{init} + \sum_{i=0}^{n} \Delta f(i) \right\} (mod 2\pi),$$

where $f_{init}$ is the frequency estimate output by the spectral estimation step 101 shown in FIG. 1. The operation of the interference frequency determiner is assumed to begin at time zero.

The output of block 615 is input to block 617, which takes the result of block 615 and multiplies it by $$e^{j2\pi \frac{f_i}{f_{sample}}}.$$

The embodiment of frequency determination of FIG. 6 utilizes only one full complex multiplication step, rather than two full complex multiplication steps as taught in the prior art. Further, blocks 603 through 613 are not operating at all times, but only when the scheduling block 601 determines that it is time to adapt. Thus, the present invention is more computationally efficient than the teachings of the prior art.

What is claimed is:
1. A method comprising the steps of:
 receiving a signal containing a desired signal and an interfering signal, wherein the interfering signal is not maintained at a constant frequency;
 measuring the frequency of the interfering signal;
 adapting a notch filter to the frequency of the interference;
 scheduling the adaptation and the measurement to avoid cancelling periodically repeating components of the desired signal, wherein the scheduling time is selected such that the scheduling time is performed on different segments of the desired signal during a fundamental period without cancelling the periodically repeating components of the desired signal on successive adaptations.

2. The method of claim 1, wherein the scheduling step is performed on a non-periodic basis.

3. The method of claim 1, wherein the desired signal has a passband and wherein the frequency of the interfering signal is within the passband.

4. An apparatus comprising:

a notch filter having a signal input, a frequency control input, and an output, wherein a signal comprising a desired signal and an interfering signal is input at the signal input;

an interference frequency determiner, having a first input coupled to the notch filter signal input and a second input coupled to the notch filter output and an output coupled to the notch filter frequency control input, wherein the interference frequency determiner comprises a scheduling block that is arranged and constructed to schedule notch filter adaptation so as to avoid cancelling periodically repeating components of the desired signal, wherein the scheduling time is selected such that the scheduling time is performed on different segments of the desired signal during a fundamental period without cancelling the periodically repeating components of the desired signal on successive adaptations.

5. The apparatus of claim 4, wherein the desired signal has a passband and wherein the frequency of the interfering signal is within the passband.

6. The apparatus of claim 4, wherein the adaptation block is comprised of:

a conjugator having an input and an output;

a complex multiplier, having a first input coupled to the output of the conjugator and having a second input and an output;

an imaginary component filter, having an input coupled to the output of the complex multiplier and having an output;

an integrate and dump filter having an input coupled to the output of the imaginary component filter and having an output;

a sign block having an input coupled to the output of the integrate and dump filter and having an output;

a scaler having an input coupled to the output of the sign block and having an output; and a summer having an input operatively coupled to the output of the scaler and having an output.

7. The apparatus of claim 6, wherein the summer is a modulo 2 π summer, which outputs a frequency expressed in radians.

8. The apparatus of claim 4, wherein the notch filter and the interference frequency determiner are disposed in a radio frequency receiver.

9. An apparatus comprising:

a notch filter having a signal input, a frequency control input, and an output, wherein a signal comprising a desired signal and an interfering signal is input at the signal input;

a filter coefficient calculator having an input and having an output operatively coupled to the frequency control input of the notch filter;

an interference frequency determiner, having a first input operatively coupled to the notch filter signal input, a second input operatively coupled to the notch filter output, and an output operatively coupled to the input of the filter coefficient calculator, wherein the interference frequency determiner comprises a scheduling block that is arranged and constructed to schedule notch filter adaptation so as to avoid cancelling periodically repeating components of the desired signal, wherein the scheduling time is selected such that the scheduling time is performed on different segments of the desired signal during a fundamental period without cancelling the periodically repeating components of the desired signal on successive adaptations.

10. The apparatus of claim 9, wherein the filter coefficient calculator is arranged and constructed to convert the output signal of the interference frequency determiner to coefficients suitable for input to the frequency control input of the notch filter.

11. The apparatus of claim 9, wherein the filter coefficient calculator is a complex exponential filter coefficient calculator.

12. The apparatus of claim 9, wherein the notch filter, the filter coefficient calculator, and the interference frequency determiner are disposed in a radio frequency receiver.

13. The apparatus of claim 9, wherein the transfer function of the notch filter is $$H(z) = \frac{1 - cz^{-1}}{1 - (1 - b_1 b_2)cz^{-1}}, \text{ where } c = e^{j2\pi \frac{f_i}{f_{sample}}}.$$

14. The apparatus of claim 13, wherein the notch filter comprises:

a first summer, having a first first summer input that receives the notch filter input and having a second first summer input and having a first summer output that provides the notch filter output;

a first multiplier, having a first first multiplier input coupled to the first summer output and having a second first multiplier input that receives a first scaler value and having a first multiplier output;

a second summer, having a first second summer input coupled to the first multiplier output and having a second second summer input and having a second summer output;

a second multiplier, having a first second multiplier input coupled to the second summer output and having a second second multiplier input that receives a second scaler value and having a second multiplier output;

a unit sample delay, having a delay input coupled to the second multiplier output and a delay output coupled to the second second summer input; and a third multiplier, having a first third multiplier input coupled to the delay output and having a second second multiplier input that receives a third scaler value and having a third multiplier output coupled to the second first summer input.

15. The apparatus of claim 14, wherein the third scaler value is provided by an apparatus comprised of:

a conjugator having an input and an output;

a complex multiplier, having a first input coupled to the output of the conjugator and having a second input and an output;

an imaginary component filter, having an input coupled to the output of the complex multiplier and having an output;

an integrate and dump filter having an input coupled to the output of the imaginary component filter and having an output;

a sign block having an input coupled to the output of the integrate and dump filter and having an output;

a scaler having an input coupled to the output of the sign block and having an output; and a summer having an input operatively coupled to the output of the scaler and having an output.

16. The apparatus of claim 15, wherein the summer is a modulo $2\pi$ summer, which outputs a frequency expressed in radians.

17. The apparatus of claim 9, wherein the desired signal has a passband and wherein the frequency of the interfering signal is within the passband.

* * * * *